Dec. 15, 1931. H. E. BRETT 1,836,641
CONTINUOUS PRESSURE COOKER AND COOLER
Filed Jan. 27, 1930 4 Sheets-Sheet 4
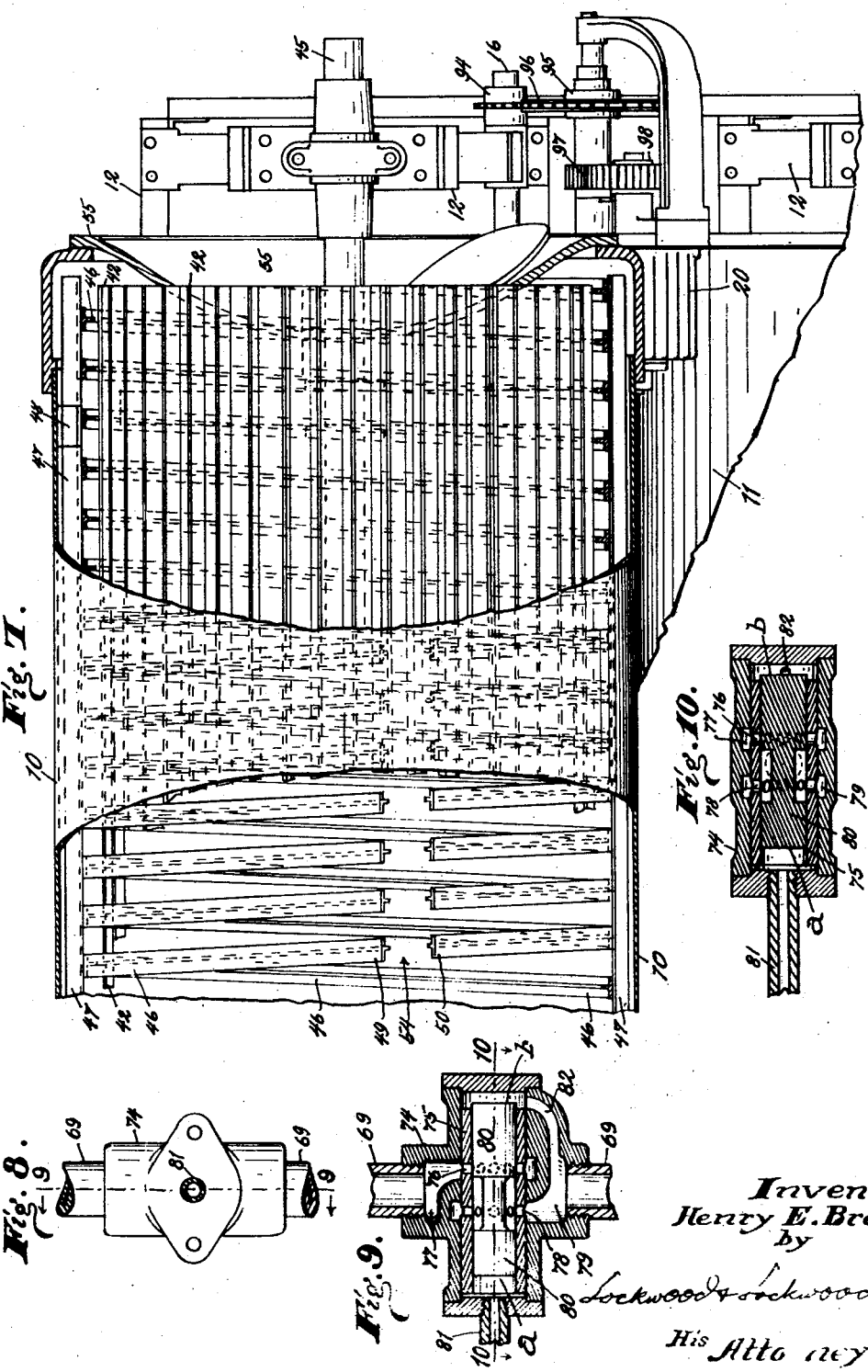

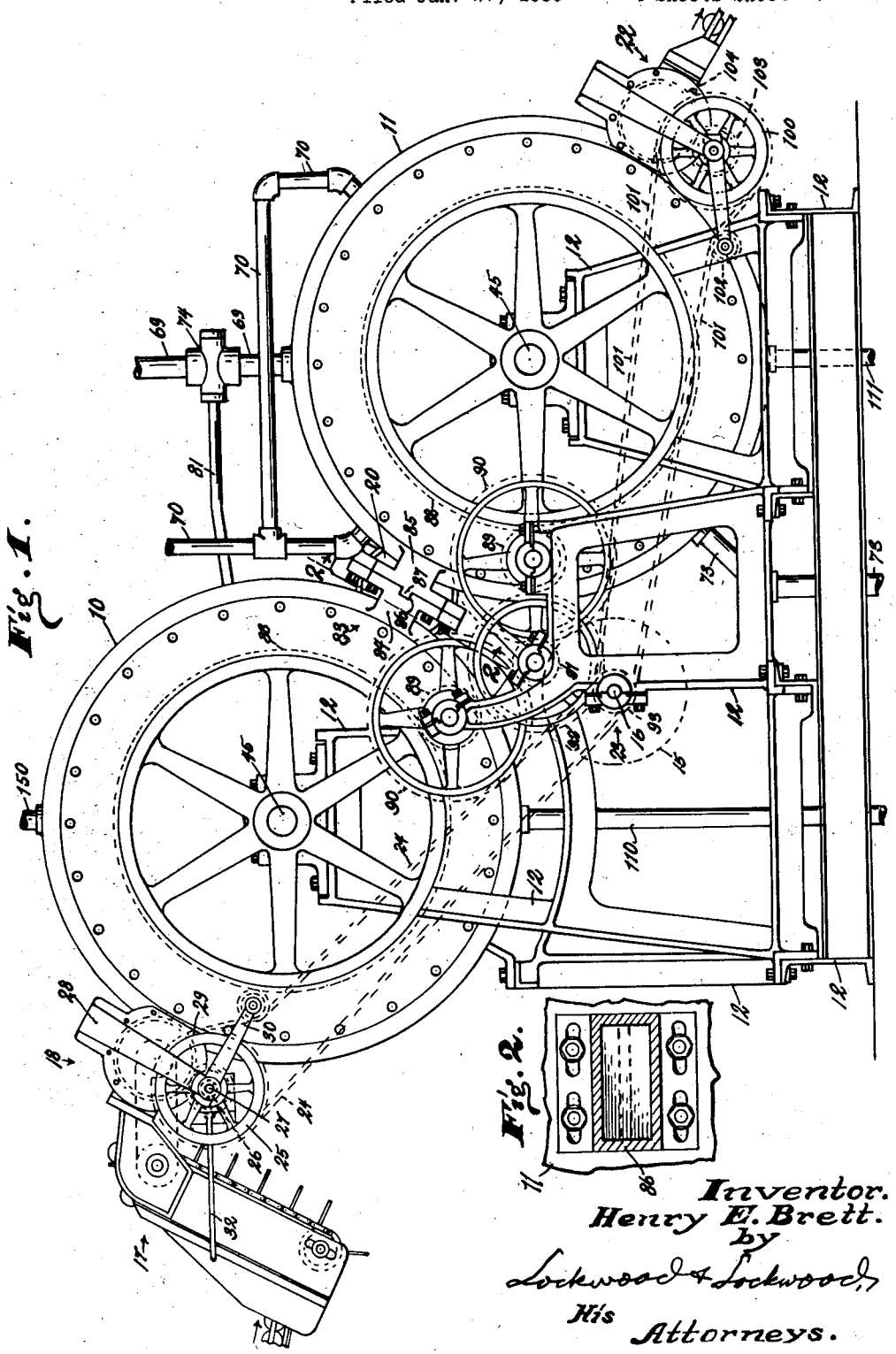

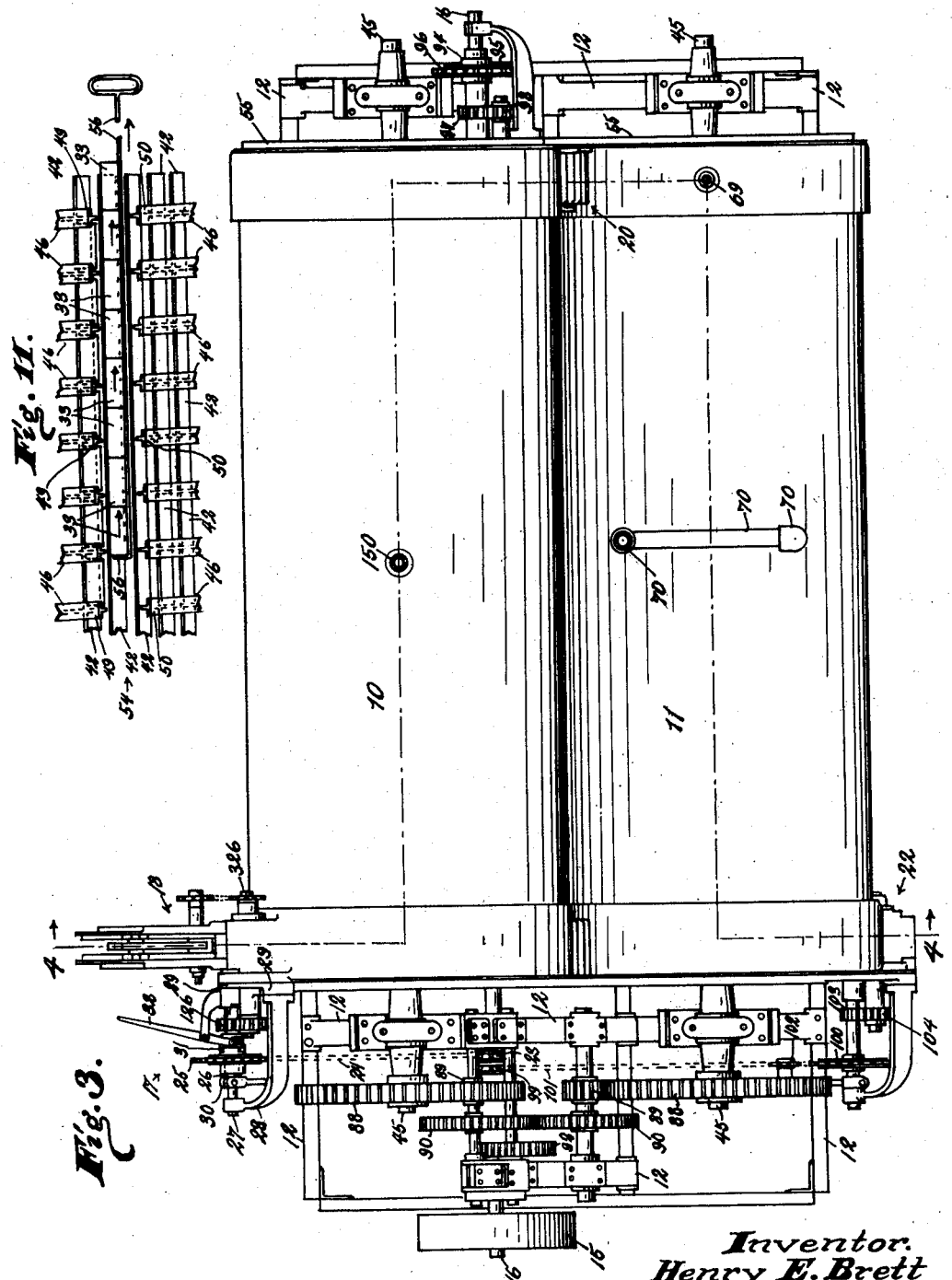

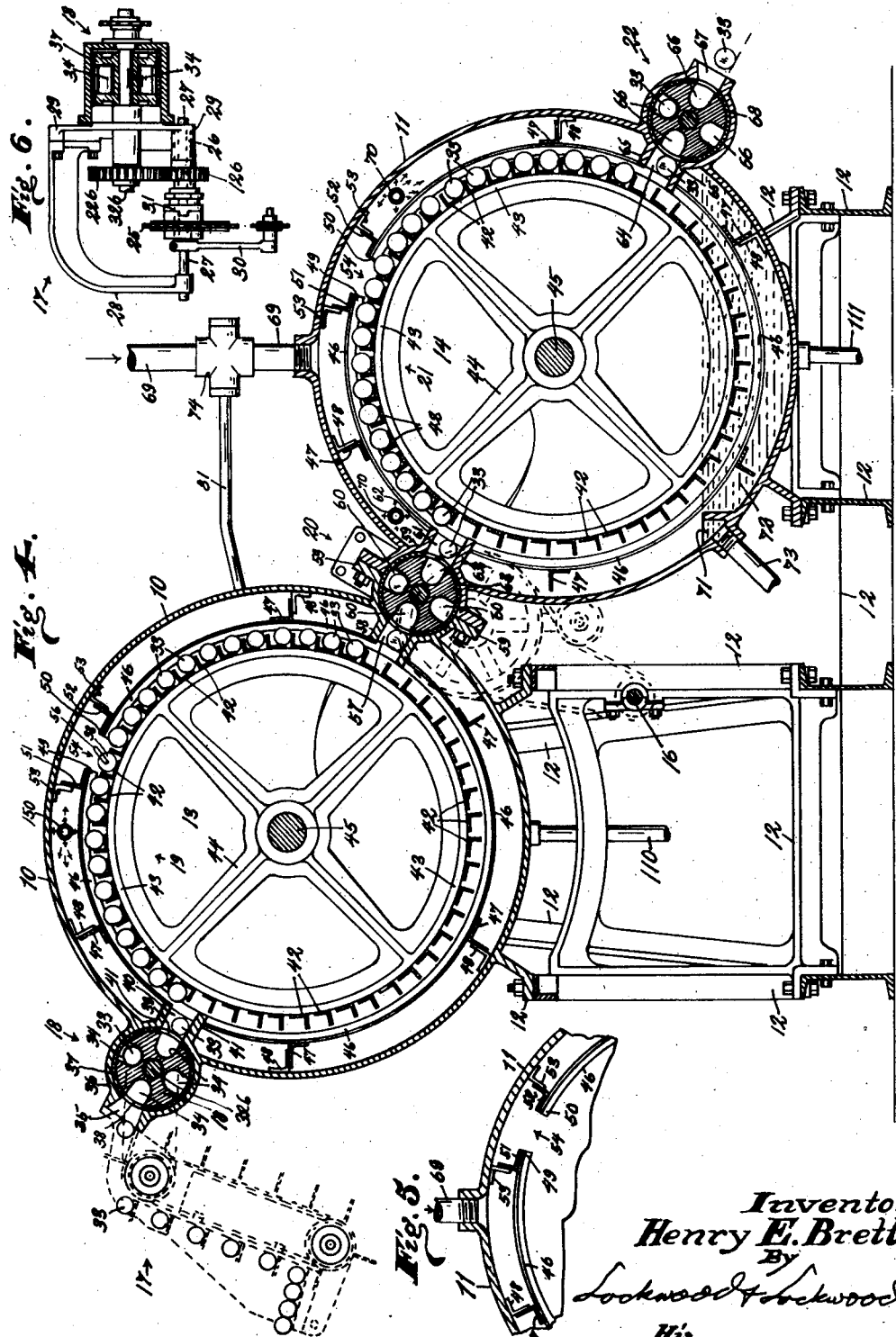

Patented Dec. 15, 1931

1,836,641

UNITED STATES PATENT OFFICE

HENRY E. BRETT, OF LOS ANGELES, CALIFORNIA

CONTINUOUS PRESSURE COOKER AND COOLER

Application filed January 27, 1930. Serial No. 423,792.

This invention relates to a continuous pressure cooking and cooling apparatus for cooking food in which the food products are first sealed in cans in a prepared and uncooked state ready for cooking and sterilizing, and the principal object is to provide an apparatus that is a great saver of time and labor in the respect that it is relatively automatic throughout in the cooking and cooling process and capable of treating a large number of cans per day in a manner adapted to save both time and labor.

To that end I provide an apparatus that in the first instance is a self-feeder so that a continuous stream of filled cans is automatically fed in at the inlet end of the cooking chamber and passed in a helical course toward the discharge end of the cooker in which travel the cans are subjected to heat so as to cook the food for a predetermined length of time, after which the cans are automatically transferred from the discharge end of the cooking chamber into the inlet end of the cooling chamber where they are immediately subjected to means to interrupt the cooking process so as not to overcook the food. Then the cans are automatically conveyed in a helical course from the inlet to the outlet end of the cooling chamber, during which travel the temperature of the cans and their contents is reduced to the temperature they had before being fed into the apparatus.

In other words when the cans are discharged from the cooling chamber they are in a suitable condition for immediate packing for storage or shipment, thereby being a great saver of time, as heretofore much time has been wasted in employing inadequate cooling means.

Another object is to provide a pressure cooking and cooling apparatus wherein the cans and their contents are heated by steam in a closed chamber under a predetermined pressure until thoroughly cooked and sterilized, and then automatically transferring the cans into a closed cooling chamber in which compressed air is maintained at a pressure equal to the steam pressure in the cooking chamber to thereby prevent internal pressure from bulging the ends or bursting the cans when transferred from one chamber to the other.

A feature of invention is shown in the means for automatically transferring cans from the cooking to the cooling chamber with a minimum loss of either steam or compressed air in the transfer of cans from one chamber to the other, and also invention is shown in the means for automatically equalizing the steam and air pressure so that they are equal or maintained at substantially the same pressure.

Also a feature of invention is shown in the arrangement of parts whereby the heated cans are subjected to an air blast the moment they are discharged from the cooking chamber so as to immediately stop the cooking process and not overcook the food, as stated.

A feature of invention is shown in the relative positions of the cooking and cooling cylinders, whereby their axes and the inlet, transfer and discharge valves are arranged in a laterally inclined plane, thereby permitting the cans to roll gently and without injury from one element into another element of the apparatus.

Another feature of invention is shown in providing an apparatus comprising few parts all essential to its operation and all being simple in form, easy to assemble and adjust or replace or repair and the moving parts being driven by a simple means and synchronized so they operate in exact time to automatically intake the cans, transfer them from one chamber to another and discharge them as stated.

Another feature of invention is shown in devising an apparatus compact in form so that it occupies a relatively small space, thereby adapting it to installation in a factory where the space is limited and of great value, thereby being economical to install, and to that end I mount the cooking and cooling units and their operating means on a single base of compact form.

Features of invention are shown in the construction, combination and arrangement of parts, whereby an apparatus for cooking and cooling canned food is provided that is easy to construct, assemble and operate, that is durable in use and highly efficient in operation.

Other objects, advantages and features of invention may appear from the accompanying drawings, the subjoined detailed description and the appended claims.

The accompanying drawings illustrate the invention, in which:

Fig. 1 is a side view of a continuous pressure cooker and cooler apparatus constructed in accordance with this invention showing the means for mounting the apparatus and actuating its moving parts, the teeth of the gears and pinions being indicated by dotted lines for the sake of clearness in the drawing.

Fig. 2 is a slightly enlarged fragmental section on line 2—2, Fig. 1, showing the sliding connection between the cooking and cooling chamber which compensates for the expansion of the former, and contraction of the latter when in use.

Fig. 3 is a plan view of the apparatus, many of the parts being shown semi-diagrammatically, also showing by dotted lines the drive chains for operating the inlet and outlet valves.

Fig. 4 is a cross section through the apparatus on the staggered line 4—4, Fig. 3, showing the apparatus in the operation of intaking cans, transferring them from cooking to the cooling chamber, and discharging them from the apparatus, omitting cans in the lower part of the chambers for the sake of clearness in the drawings, also showing by dotted lines the means for feeding the cans to the inlet valve of the apparatus and showing the axes of the cylinders and valves arranged in a laterally inclined plane.

Fig. 5 is a fragmental cross sectional view of one of the cylinders showing the gap in the helical can guide through which cans can be removed from the apparatus in the event that it becomes necessary.

Fig. 6 is a sectional view of the inlet valve and plan view of the means for driving it, parts indicated semi-diagrammatically and parts omitted for the sake of clearness in the drawing.

Fig. 7 is an enlarged fragmental plan view of the discharge end portion of the cooking cylinder, parts in section and parts broken away to show a detail of the means for passing the cans in a helical path from the inlet to the outlet end of the cooking chamber, showing the helical guide, the longitudinal supporting bars and gap in the helical guide.

Fig. 8 is a perspective view of the equalizing pressure valve arranged to maintain an equal pressure in the cooking and cooling cylinders.

Fig. 9 is a central vertical section on the line 9—9, Fig. 8.

Fig. 10 is a cross section on line 10—10, Fig. 9.

Fig. 11 is a semi-diagrammatic fragmental plan view of the can carrier showing the gap in the helical guide and a draw bar used to draw a row of cans from the apparatus, parts omitted for the sake of clearness in the drawing.

The apparatus includes the cylinders 10 and 11 arranged side by side and supported on the frame 12 so that the cylinder 10 is at a higher elevation than the cylinder 11, the former enclosing the cooking chamber 13 and the latter enclosing the cooling chamber 14; also the frame 12 is arranged to support the driving means for operating the apparatus.

The driving means for actuating the mechanism in the cooking and cooling chambers is driven by a pulley 15 mounted on a drive shaft 16, as shown in Fig. 3 by full lines and by dotted lines in Fig. 1. The pulley 15 is omitted from the other drawing. It is driven by means not shown but well understood in the art.

The apparatus is driven so that the feed mechanism 17, inlet valve 18, cooked can carrier 19, transfer valve 20, cooler can carrier 21 and discharge valve 22 are moved in substantially the same time or synchronized so that when in operation an uninterrupted flow of cans can be passed into, through and out of the apparatus with great precision and with a uniform cooking and cooling of the food.

The feeder 17 and inlet valve 18 are actuated by the sprocket wheel 23 on the drive shaft 16 connected by a chain 24 to another sprocket wheel 25 on the quill shaft 26 supported on a fixed shaft 27 that is secured in the bracket 28 and valve frame 29. The chain 24 is provided with a tightener 30. The quill shaft 26 carries a gear 126 that meshes with a gear 226 on the shaft 326 of the valve 18.

The feeder 17 is provided with a clutch 31 and clutch lever 32 so that the feeder and valve 18 can be stopped whenever necessary and also so that the other parts of the apparatus can be continued in operation to empty the cooking and cooling chamber of the cans therein.

The feeder 17 is old and well understood in the art, consequently it is semi-diagrammatically shown by full and dotted lines in the drawings and not completely described in detail, it being understood that it is actuated in time to discharge cans through the inlet opening 35 33 into one of the pockets 34 of the valve 18 in the valve housing 36 that is integral with the cylinder 10, see Fig. 4.

The valve housing 36 is provided with a bushing 37 in which the valve rotates and this bushing is provided with openings 38 and 39, one of which is in register with the inlet passage 35 and the other in register with the discharge passage 40 between the guide extensions 41 that are integral with the valve housing 36 with the parts arranged so that the passage for the cans is inclined downwardly. The valve 18 is fitted sufficiently tight in the bushing 37 to prevent the escape of steam from the cylinder 10 except that that is carried out of the cylinder by the pockets 34.

When the cans 33 discharge from the inlet valve 18 through passage 40 they roll gently by gravity into the carrier in one or another of the numerous troughs or channels formed by the spaced angle irons 42 secured on the peripheries of the annular rims 43 of the spiders 44 mounted on the shaft 45. The angle irons extend longitudinally of the shaft 45 and from end to end of the cooking chamber 13.

The cans 33 are moved endwise in the cooking chamber in a helical course by a conveyor formed by angle irons 42 spaced apart and arranged on the annular rims 43 of spiders 44 mounted on the shaft 45, and a helical T-iron guide 46 secured to other angle irons 47 that are secured to the inner periphery of the cylinder 10 by brackets 48. The angle irons 42 are spaced apart to form channels extending lengthwise through the cooking chamber near the inner periphery of the cylinder 10 through which the cans are moved endwise from the inlet to the outlet end of the cylinder by the helical T-iron guide that is arranged to progressively move the cans along in their respective channels as the conveyor is rotated.

There is a conveyor in each of the cylinders 10 and 11 that are constructed and operated substantially alike except that the helix in the cooling chamber moves the cans longitudinally in a reverse direction from the movement of the cans in the cooking chamber. In other words the cans in the cooking chamber are moved longitudinally from the front to the rear end of the apparatus, and their direction of longitudinal travel is reversed in the cooling chamber so that the cans are fed in and discharged from the front end of the apparatus. From the foregoing it will be understood that a description of one will describe both conveyors.

The helix in both cylinders is formed of segments having their adjacent ends 49, 50 secured to longitudinally arranged angle irons 51, 52 secured to the inner wall of the cylinders by brackets 53 to form an elongated gap 54 in the helix through which the cans can be quickly removed from either cylinder in the event that it is necessary.

In other words if a can becomes jammed in either cylinder the cans can be removed from either one or both cylinders by first removing the cylinder heads 55 at the rear end of the apparatus and then by means of a long draw-bar 56 the rows of can 33 at the gap 54 in the helix can be drawn endwise out of the apparatus as illustrated in Fig. 11. Then by rotating the conveyors step by step to bring each of the numerous rows of cans under the gap the apparatus can be emptied as described.

When the cans 33 reach the discharge end of the cooking chamber they automatically roll out of their respective channels between the angle irons 42 downwardly into an inclined passage 57 between the guides 58 that are integral with the upper half of the split valve housing 59, and enter one of the pockets 60 of the rotary transfer valve 20 which on rotating moves the cans in an arc until the pockets 60 are in register with the downwardly inclined passage 61 between the guides 62 that are integral with the lower half of the split housing 59.

When the pockets 60 are in register with the passage 61 the cans 33 roll down by gravity into one of the many channels between the angle irons 42 where in addition to being moved in a helical course they are also moved longitudinally from the inlet to the discharge end of the cooling chamber and in their longitudinal movement they travel in a reverse direction from that traveled in the cooking chamber so that when discharged they are at the same end of the apparatus from which they started but on the opposite side.

The transfer valve 20 is rotated in a bushing 63 so that it forms a sufficiently tight fit around the periphery of the valve to prevent steam from escaping from the cooking chamber into the cooling chamber and also so that compressed air in the latter cannot escape into the former except that that is carried around in the pockets 60.

The cans 33 after traversing the length of the cooling chamber are discharged by gravity into an inclined passage 64 between the guides 65 that are integal with the valve housing 65 of the discharge valve 22 and roll into one of the pockets 66 of the discharge valve when the pockets and passage are in register. Then the discharged cans are carried in an arc to the inclined passage 67 where they roll by gravity into the outer air. By this rolling action the cans are gently passed without injury from one member to another of the apparatus.

The valve 22 is fitted sufficiently tight in a bushing 68 in the housing 65 to prevent compressed air from escaping from the cylinder 11 except that that is carried out by the pockets 66.

After the cans 33 have passed through the cooking chamber to cook and sterilize their contents they are subjected to a blast of compressed air or water just as they enter the cooling chamber to immediately chill the cans and prevent over-cooking of the food. The air blast is supplied through the pipe 69 and the water blast through the pipe 70 which on the interior of the cylinder are perforated to spray the cans while moved by the carrier. Also I provide a weir 71 that is raised a considerable distance so as to form a pool of cooling water 72 in the bottom of the cooling chamber through which the cans are passed by the rotary carrier. This weir is also located below the level of the can discharge passage, thereby preventing the escape of water through the said passage.

The weir 71 is provided with an overflow pipe 73 that leads off to a trap not shown so that compressed air at the same pressure as the steam in the cooking chamber can be carried in the cooling chamber. The reason the same pressure is maintained in both cylinders is to prevent the ends of the cans swelling and bursting when discharged from the cooking chamber.

The pressure between the cylinders is maintained relatively equal by means of an equalizing valve 74 interposed in the compressed air pipe 69. The housing of this valve is provided with a transverse cylindrical bore in which a sleeve 75 is secured that has one set of ports 76 connected to the chamber 77 and another set of ports 78 connected to the chamber 79 with a piston 80 adapted to be moved so as to open the ports 76 to establish communication between the chambers 77 and 79 or open the compressed air passage through the pipe 69 to the cylinder 11 to increase its pressure equal to the steam pressure in the cylinder 10.

The piston 80 is moved to open the ports 76 by means of steam pressure in the cylinder 10 acting on the end of the piston at *a* through the connecting pipe 81 so that when the steam pressure in the cylinder 10 exceeds the air pressure in the cylinder 11 the piston will be moved to admit a higher air pressure in the latter cylinder until the pressures are equal, at which time the pressure of air through the passage 82 on the end *b* of the piston will return it to its normal position closing the ports 76.

As previously indicated, the cylinder 10 at its discharge end and the cylinder 11 at its inlet end are secured together by the transfer valve housing 59 that is provided with the usual flanges and bolts, as best shown in Fig. 4, so that they are rigidly connected. However, the other ends of these cylinders are connected by a slip joint 83, as best shown in Figs. 1 and 2, and as seen therein the cylinders 10 and 11 are provided with flanged extensions 84, 85 that are bolted together so that both cylinders can expand and contract independently of one another. Preferably the extension 84 is provided with a groove 86 in which a bead 87 is snugly fitted with the bead and groove parallel with the longitudinal axes of the cylinders.

The can carriers in each of the cylinders 10 and 11 are substantially alike and are driven in the same way and in the same time and also, as previously indicated, they are driven in a timed relationship to the valves 18, 20 and 22.

The driving means for these parts is old in the art and for that reason is shown only semi-diagrammatically in the drawings and for the sake of brevity in the specification is described briefly.

Both carriers are mounted on shafts 45 that are connected by a train of gears 88, 89, 90, 91, 92 and 93 with the drive shaft 16. The valve 20 is driven by the drive shaft though the sprocket wheels 94, 95, chains 96 and gears 97 and 98, see Figs. 3 and 7.

The discharge valve is driven by the shaft 16 through the sprocket wheels 99, 100, chain 101, chain tightener 102 and gears 103 and 104, see Figs. 1 and 3.

The steam chamber in the cylinder 10 is provided with the usual drain pipe 110 connected with a trap not shown but well understood in the art, and steam is admitted to the chamber from some source of supply, not shown, through the pipe 150, see Figs. 1, 3 and 4. Also I provide a drain pipe 111 for the chamber in cylinder 11 that can be provided with the usual drain valve not shown.

In operation the cylinder 10 is charged with the right pressure of steam and the cylinder 11 with compressed air at the same pressure with a constant flow of water into the chamber 11 so that the cans will be chilled the moment they are discharged from the cylinder 10. Then the shaft 16 is driven at the proper speed to rotate the moving parts of the apparatus, after which the clutch of the feeder is shifted to start the cans toward the valve 18 which feeds them into the cooking cylinder 10 The cans are conveyed through the cylinder 10 and while passing through are subjected to steam heat to cook their contents, and simultaneously the cans are agitated by their endwise and helical movement, causing a continuous change of position of the food in the cans, thereby effecting an even cooking of the food that otherwise could not easly be accomplished. The cans when they have reached the discharge end of the cooking chamber are then transferred as described into the cooling chamber where the cooking process on the food is immediately arrested by blasts of compressed air and water on the cans, and after being cooled are discharged from the apparatus ready to pack for storage or shipment.

I claim as my invention:

1. A pressure cooking and cooling apparatus including a cooking cylinder having a cooking chamber therein, a cooling cylinder having a cooling chamber therein said cylinders arranged side by side and parallel to one another, automatic means for equalizing the pressure between the cooking and cooling chambers, and other means for conveying cans through said cylinders to cook and cool their contents.

2. A pressure cooking and cooling apparatus including a cooking cylinder disposed horizontally and having a cooking chamber therein, an inlet valve for successively feeding cans into the cooking chamber, means for conveying the cans from the inlet toward the discharge end of the cooking chamber, a cooling cylinder arranged adjacent said cooking cylinder, a transfer valve for transferring cans from the cooking into the cooling cylinder, said valves arranged in a laterally inclined plane and actuated so that they move the cans transversely to the longitudinal axes of said cylinders, a compressed air pipe leading into the cooling chamber, and means connected with said pipe for maintaining the air pressure equal to the steam pressure for the purpose specified.

3. A cooking and cooling apparatus including a cooking cylinder having a valve housing with an inlet passage therethrough, a cooling cylinder, a transfer valve housing having a passage therethrough that connects the chambers of said cylinders, valves disposed in the passages that are adapted to seal them to prevent steam and air escaping from cylinder to cylinder and also permitting the passage of cans from cylinder to cylinder, means to convey cans through said cylinders successively, means to maintain steam pressure in the cooking cylinder to provide the desired temperature for cooking the contents of the cans, means to supply cooling fluid to the cans when discharged from the cooking into the cooling cylinder, means to supply compressed air to the cooling cylinder, and means controlled by the steam pressure in the cooking cylinder to automatically regulate the air pressure in the cooling cylinder.

4. A cooking and cooling apparatus including a cooking cylinder, a valve housing having an inlet passage therethrough, a cooling cylinder, a transfer valve housing having a passage connecting the chambers of said cylinders, a discharge valve housing at the outlet end of said cooling cylinder having a passage therethrough, valves disposed in the passages adapted to seal them against the escape of steam and compressed air from said cylinders and also permit the successive transmission of cans through the passages, means for conveying cans through said cylinders successively, means to maintain steam pressure in the cooking chamber to provide the desired temperature for cooking the contents of the cans, means for supplying water to the cooling cylinder, an air pipe for supplying compressed air to the cooling chamber, a regulating valve mounted in the air pipe controlled by the steam pressure in the cooking chamber to automatically maintain an equal pressure between the cooking and cooling chambers.

5. A cooking and cooling apparatus including a cooking cylinder having a cooking chamber therein, means to maintain a steam pressure in the cooking chamber, a cooling cylinder having a cooling chamber therein that is operatively connected with the cooking chamber, means including an air pipe to supply compressed air to the cooling chamber, a pressure regulating valve mounted in the air pipe, said valve comprising a body having inlet and outlet ends communicating with a valve chamber, a tubular valve seat in the valve chamber, ports in the valve seat, a balanced piston valve freely mounted in said seat adapted to open and close the ports, said body having a duct connecting the valve outlet with one end of the valve chamber to admit pressure from the cooling chamber, and means to admit pressure to the other end of the valve chamber from the cooking chamber to actuate the piston valve and thereby equalize the pressures in the cooking and cooling chambers.

6. A cooking and cooling apparatus including a cooking cylinder, means to maintain steam pressure in said cylinder, a cooling cylinder operatively connected with the cooking cylinder, means including a pressure pipe to supply compressed air to the cooling cylinder, and a pressure regulating valve mounted in the pressure pipe adated to automatically maintain an equal pressure in said cylinders.

7. In a cooking and cooling apparatus, a chamber having inlet and outlet passages, valves in said passages for moving cans into and out of said chamber, a rotary can carrier mounted on the shaft having longitudinal channels to hold the cans, a stationary helical guide having a gap therein mounted within the chamber cooperating with the rotary can carrier to convey cans through the chamber, means to actuate the valves and can carrier, and means whereby rows of cans may be removed from the apparatus through the gaps in said guides.

8. Pressure cooking and cooling cylinders mounted on parallel axes, inlet, transfer and discharge valve housings connected to said cylinders and having inlet transfer and outlet passages, valves in said housings adapted to the passage of cans into and out of said cylinders and to seal the passage to prevent the escapement of steam and compressed air from the cylinders, means outside of said cylinders for regulating and equalizing the pressure in the cooking and cooling chambers of said cylinders, a can conveyor in each of said cylinders, shafts on which said conveyors are mounted, driving means for operating the valves and can carriers in timed agreement, and a single drive shaft for actuating said driving means.

9. A cooling and cooking apparatus including a frame, a cooking cylinder on said frame, a cooling cylinder supported on said frame and arranged parallel with said cooking cylinder, a valve housing rigidly connecting said cylinders adjacent one of their ends, a flanged extension on one of said cylinders adjacent the other end thereof, another flanged extension on the other cylinder that slidably engages said other extension, and means for slidably securing said extensions together.

10. A cooking and cooling apparatus including a cooking chamber, means to maintain steam pressure in said chamber including a pipe, a cooling chamber operatively connected with the cooking chamber, another pipe to supply compressed air to the cooling chamber, a valve interposed in said air pipe, and means controlled by the steam pressure in the cooking chamber coacting with the pressure in the cooling chamber to automatically regulate the air pressure in the cooling chamber through said valve.

11. In a pressure cooking and cooling apparatus the combination with cooking and cooling chambers adapted to have charged cans passed through them under steam and air pressure in their respective cylinders, of an air pipe adapted to supply compressed air to said cooling chamber, an equalizer valve in said air pipe actuated by the opposing pressures in both of said cylinders, and a pipe connection from said valve to said cooking chamber for the purpose specified.

12. In a pressure cooking and cooling apparatus the combination with cooking and cooling chambers adapted to have charged cans passed through them under steam and air pressure, of a compressed air pipe adapted to supply compressed air to said cooling chamber, an equalizer valve in said pipe, a sleeve in said valve having ports therethrough, a piston movable by either air or steam pressure to open and close said ports, and a pipe connection between said valve and said steam chamber for the purpose specified.

13. A pressure cooking and cooling apparatus including a cooking cylinder having a cooking chamber therein, a valve at the inlet end of said cylinder adapted to feed cans into the cooking chamber, means for conveying cans from the inlet to the discharge end of the cooking chamber, a cooling cylinder having a cooling chamber therein, said cooling cylinder disposed in a laterally inclined plane relative to said cooking cylinder, means between and transverse to the longitudinal axes of said cylinders including a valve housing having an inclined radial passage for automatically transferring cans from the cooking to the cooling chambers, means for conveying cans from the inlet to the discharge end of said cooling chamber, and means for discharging cans from the cooling chamber.

14. A pressure cooking and cooling apparatus including a cooking cylinder having a cooking chamber therein, a cooling cylinder having a cooling chamber therein, said cylinders disposed horizontally adjacent and parallel to one another in different horizontal and vertical planes, a transfer valve housing connecting said cylinders, a transfer valve mounted within the said housing, an inclined passage through the said housing disposed radially to the two cylinders to permit cans to pass by gravity from the cooking chamber to the transfer valve and from the said valve to the cooling chamber, and means for conveying cans through said cylinders to cook and cool their contents.

In witness whereof, I have hereunto affixed my signature.

HENRY E. BRETT.